UNITED STATES PATENT OFFICE.

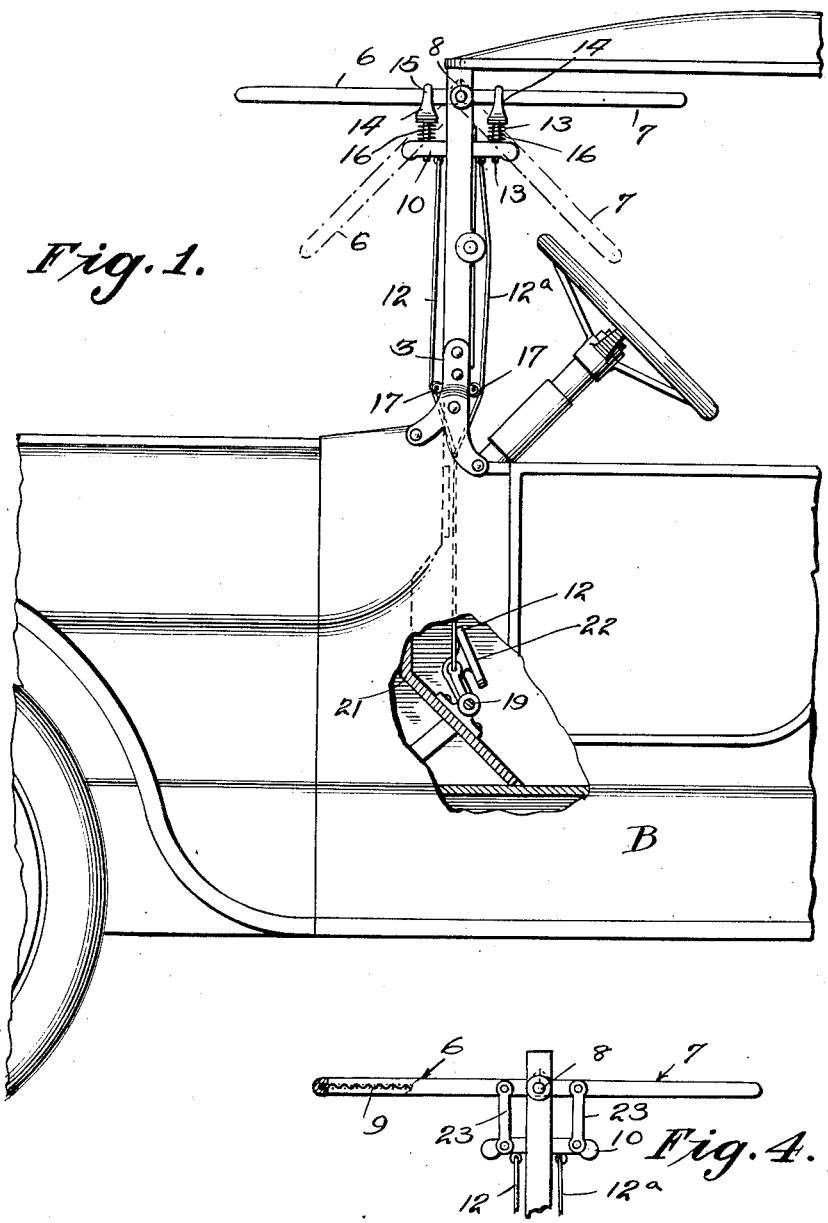

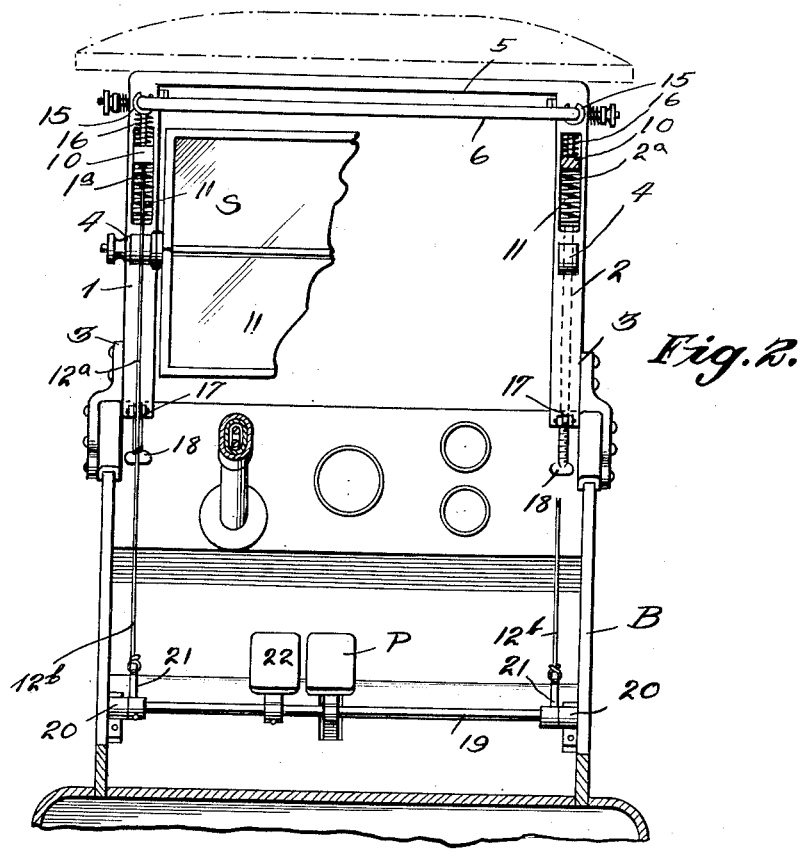
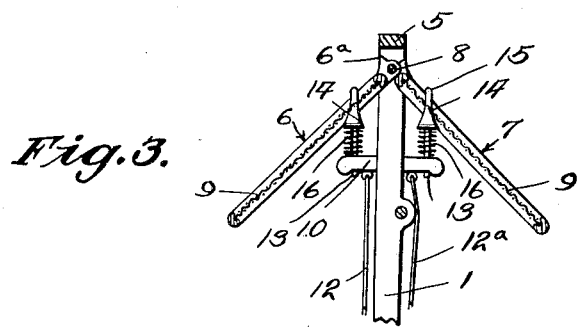

DOSABHOY E. BHARUCHA, OF BOMBAY, INDIA.

AUXILIARY SHIELD FOR MOTOR-VEHICLES.

1,383,282.　　　　Specification of Letters Patent.　　Patented July 5, 1921.

Application filed June 11, 1920. Serial No. 388,181.

*To all whom it may concern:*

Be it known that I, DOSABHOY E. BHARUCHA, a subject of the King of Great Britain, residing at Bombay, India, have invented certain new and useful Improvements in an Auxiliary Shield for Motor-Vehicles, of which the following is a specification.

This invention relates to an attachment for wind shields for motor vehicles.

The object of the invention is to provide a simple and efficient device for protecting the occupants of the front seat of a motor vehicle against injury incident to broken glass should the wind shield be broken.

Another object is to provide a protector of this character having combined therewith operating means, a portion of which is automatic and another portion manually controllable so that the protector will automatically assume an out of the way position when released by the manually controllable means and also adapted to be moved to its useful position by the operator of the vehicle whenever required.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a portion of an automobile showing this attachment applied and arranged in inoperative position in full lines and in operative position in dotted lines, parts being broken out.

Fig. 2 is a rear elevation of the wind shield taken from the interior of the vehicle with parts broken out and in section.

Fig. 3 is a detail vertical section showing the auxiliary shield in lowered operative position; and Fig. 4 is a detailed end elevation, partly in section showing a slightly modified form of the invention.

In the embodiment illustrated a motor vehicle body B is shown, having the usual steering wheel and the ordinary windshield S.

The attachment constituting this invention comprises two standards 1 and 2 secured to opposite sides of body B at the point where the ordinary windshield S is mounted, said standards being secured by heavy castings 3 to said body. These standards 1 and 2 which constitute a part of this invention also support the windshield S, the bearings of which are shown at 4.

The upper portions of the standards 1 and 2 have slots or recesses 1$^a$ and 2$^a$ extending transversely therethrough from front to rear and extending longitudinally at points above the bearings 4. The upper ends of these standards 1 and 2 are connected by a cross bar 5 and adjacent said bar in said standards are mounted the pintles 8 of the members 6 and 7 forming a part of this auxiliary windshield.

These members 6 and 7 are hingedly connected at their inner ends, member 6 having a lip 6$^a$ adapted to lap over and engage the member 7 when the shield is in inoperative position to prevent them from moving upward beyond a horizontal plane. Mounted in the frame of these members 6 and 7, which is composed of rods or bars arranged in rectangular form, is a filling or cover material 9, preferably composed of screen wire, which will permit the driver to see therethrough and will protect him against pieces of broken glass or other objects, these members being primarily designed for protection against broken windshields but obviously will protect against other objects as well.

Two cross bars or arms 10 are mounted in the slots 1$^a$ and 2$^a$ of the standards and project at opposite ends beyond the front and rear faces of the standards. Mounted in these slots below the arms 10 are coiled springs 11 which exert their tension normally to move the arms upward for a purpose presently to be described.

Secured to each of the arms 10 outside its standard are two wires or cables 12 and 12$^a$, which extend downwardly into the body B of the car and merge at their lower ends below the windshield into a cable 12$^b$, which is connected for manual control of the auxiliary shield in a manner hereinafter to be described.

Rising from the ends of each arm 10 and secured thereto are rods 13 carrying at their upper ends substantially Y-shaped heads 14, the arms 15 of which are curved inwardly and engage the side rods of the members 6 and 7 as is shown clearly in Fig. 2, permitting said rods to slide freely therein.

Coil springs 16 are mounted on the rods 13 between the arms 10 and heads 14, and operate as cushioning elements for the members 6 and 7.

The cables 12 and 12ª pass at their lower ends over pulleys 17 disposed on the front and rear sides of the standards, as is shown clearly in Fig. 1.

Spring adjusting screw rods 18 extend through the lower ends of the standards 1 and 2 and are operable for controlling the tension of the springs 11.

A shaft 19 extends transversely across the front portion of the vehicle body B and is mounted in turn in suitable bearings 20, secured to said body at opposite sides thereof, as is shown clearly in Fig. 2. Arms 21 are fixed to this shaft 19 and are connected with the lower ends of the cables 12ᵇ, so that when said shaft is turned in one direction a pull will be exerted on these cables and operated to move the arms or bars 10 downwardly against the tension of the springs 11. This downward movement of the arms will cause the heads 14 carried thereby to slide downwardly on the side bars of the members 6 and 7, thus drawing said members downwardly into the dotted line position, shown in Fig. 1. These members 6 and 7 are of a width sufficient to permit member 7 to swing down over the steering wheel S W so as to effectively protect the driver against flying objects in front of him.

A pedal 22 is fixed to the shaft 19 and is arranged adjacent the brake pedal P and in such close proximity thereto that the driver may easily operate both pedals at once and as he usually drives with his foot on the pedal P, in case of emergency when he presses the pedal to apply the brakes, his foot extending over pedal 22, will simultaneously depress it with the application of the brakes, so that the auxiliary wind shield will be automatically lowered and thus protect the driver, should an accident occur and break the wind-shield.

While the pedal 22 may be operated simultaneously with the brake P obviously they may be operated independently, so that the brakes may be applied without lowering the auxiliary windshield or protector and vice versa.

From the above description it will be obvious that the protector constituting this invention may be quickly lowered into operative position by pressure exerted on the pedal 22 and when said pedal is released the springs 11 will operate to raise the arms 10 and through them elevate the hinged members 6 and 7 into the full line position shown in Fig. 1 where they will be out of the way and not interfere with the vision of the driver.

In the form shown in Fig. 4 the parts are the same, except that instead of using the Y-shaped members for connecting the arms 10 with the protector members 6 and 7, links 23 are employed for making this connection. These links 23 are pivotally connected at their ends with the arms 10 and the members 6 and 7 and operate to raise and lower said members 6 and 7 in the same manner as the device hereinabove described.

From the foregoing description, taken in connection with the accompanying drawing, the advantages of the construction and the method of operation will be readily apparent to those skilled in the art to which the invention appertains, and while I have described the principle of operation of the invention together with the device which I now consider to be the best embodiment, I desire to have it understood that the device shown is merely illustrative, and that such changes may be made as are within the scope of the claimed invention.

What is claimed is:—

1. The combination with a supporting frame having a windshield mounted therein, of a protector for use in connection therewith comprising a pair of hingedly connected members mounted over said shield one to open downwardly on one side of said shield, and the other on the other side thereof, bars arranged transversely of said frame to move vertically, members carried by said bars and slidably engaged with said hinged members whereby the raising and lowering of said bars operates to open and close said hinged members, springs for normally holding said bars elevated, and means under the control of the driver for lowering said bars to bring the protector into operative position.

2. The combination with a supporting frame having a windshield mounted therein, of a protector for use in connection therewith comprising a pair of hingedly connected members mounted over said shield one to open downwardly on one side of said shield, and the other on the other side thereof, bars arranged transversely of said frame to move vertically, members carried by said bars and slidably engaged with said hinged members whereby the raising and lowering of said bars operates to open and close said hinged members, springs for normally holding said bars elevated, and means under the control of the driver for lowering said bars to bring the protector into operative position and cushioning means for said hinged members.

In testimony whereof I affix my signature in presence of two witnesses.

DOSABHOY E. BHARUCHA.

Witnesses:
LALLA DOOLOB,
EMMA E. SHALMAN.